US012391046B2

(12) United States Patent
Butschko et al.

(10) Patent No.: US 12,391,046 B2
(45) Date of Patent: Aug. 19, 2025

(54) METHOD OF CLEANING NOZZLE SURFACES OF AN INKJET PRINT HEAD ASSEMBLY

(71) Applicant: Heidelberger Druckmaschinen AG, Heidelberg (DE)

(72) Inventors: Sven Butschko, Hockenheim (DE); Rene Stückroth, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 192 days.

(21) Appl. No.: 18/328,899

(22) Filed: Jun. 5, 2023

(65) Prior Publication Data

US 2024/0042765 A1 Feb. 8, 2024

(30) Foreign Application Priority Data

Aug. 3, 2022 (EP) .................................... 22188456

(51) Int. Cl.
*B41J 2/165* (2006.01)

(52) U.S. Cl.
CPC ....... *B41J 2/16552* (2013.01); *B41J 2/16523* (2013.01); *B41J 2002/16558* (2013.01); *B41J 2002/16567* (2013.01)

(58) Field of Classification Search
CPC .......... B41J 2/16552; B41J 2002/16558; B41J 2002/16567
See application file for complete search history.

(56) References Cited

U.S. PATENT DOCUMENTS

| | | | |
|---|---|---|---|
| 5,574,485 A | 11/1996 | Anderson et al. | |
| 2022/0088933 A1 | 3/2022 | Yourlo et al. | |

FOREIGN PATENT DOCUMENTS

| | | | | |
|---|---|---|---|---|
| DE | 10028318 A1 * | 3/2001 | .......... | B41J 2/16508 |
| DE | 102020105736 A1 | 10/2020 | | |
| WO | WO-2016002896 A1 * | 1/2016 | .......... | B41J 2/16535 |

* cited by examiner

*Primary Examiner* — Sharon Polk
(74) *Attorney, Agent, or Firm* — Laurence A. Greenberg; Werner H. Stemer; Ralph E. Locher

(57) ABSTRACT

A method for cleaning nozzle surfaces of an inkjet print head assembly includes using a cleaning slide to carry out a movement along the assembly and clean the nozzle surfaces with a cleaning liquid in ultrasonic vibration. The cleaning slide includes an ultrasonic cleaning device, a suction device, and a rinsing device and the movement of the cleaning slide includes a forward movement and a backward movement. During the forward movement, the ultrasonic cleaning device and the suction device following the ultrasonic cleaning device are activated while the rinsing device following the two is deactivated. During the backward movement, the rinsing device and the suction device following the rinsing device are activated while the ultrasonic cleaning device following the two is deactivated. Cleaning liquid and contamination are advantageously prevented from reaching the interior of print heads or into an ink supply system thereof, preferably in industrial inkjet printing.

12 Claims, 3 Drawing Sheets

METHOD OF CLEANING NOZZLE SURFACES OF AN INKJET PRINT HEAD ASSEMBLY

CROSS-REFERENCE TO RELATED APPLICATION

This application claims the priority, under 35 U.S.C. § 119, of European Patent Application EP22188456.2, filed Aug. 3, 2022; the prior application is herewith incorporated by reference in its entirety.

FIELD AND BACKGROUND OF THE INVENTION

The invention relates to a method of cleaning nozzle surfaces of an assembly of inkjet print heads, in which a cleaning slide carries out a movement along the assembly and cleans the nozzle surfaces with a cleaning liquid in ultrasonic vibration.

The technical field of the invention is the field of the graphic industry and in particular the field of industrial, i.e. high-performance, high-quality inkjet printing on flat substrates, i.e. the application of tiny droplets of liquid ink in accordance with an image onto flat substrates such as sheet-shaped, web-shaped, foil-shaped, or label-shaped printing substrates, preferably made of paper, cardboard, plastic, metal, or composite materials. In particular, the field of the invention is the field of cleaning print heads or rather the sensitive nozzle surfaces.

DESCRIPTION OF THE RELATED ART

German Patent Application DE 10 2020 105 736 A1 discloses inkjet print head cleaning by using ultrasound, wherein cleaning fluid caused to vibrate in ultrasonic vibration is applied to the nozzle surface of a print head of a print bar from a cleaning trough, flows off through a gap between the cleaning trough and the print head, and is collected in a collecting trough. In that process, a relative movement may be generated by moving the print heads along the cleaning trough. In addition, cleaning liquid may be injected and ejected during the cleaning operation, a process known as "purging."

A problem that may occur in that context, is that cleaning liquid with contamination may get into the print heads.

SUMMARY OF THE INVENTION

It is accordingly an object of the invention to provide a method of cleaning nozzle surfaces of an inkjet print head assembly, which overcomes the hereinafore-mentioned disadvantages of, and provides an improvement over, the heretofore-known methods of this general type, namely an improvement that in particular prevents cleaning liquid with contamination from getting into the interior of print heads or into their ink supply system.

In particular, the intention is to prevent cleaning liquid from entering the nozzles and from thus contaminating the ink because that would create another problem: ink which has been contaminated in that way may not cure correctly or even not cure at all and may need to be exchanged.

With the foregoing and other objects in view there is provided, in accordance with the invention, a cleaning method for cleaning nozzle surfaces of an assembly of inkjet print heads, wherein a cleaning slide carries out a movement along the assembly and cleans the nozzle surfaces with a cleaning liquid caused to vibrate in ultrasonic vibration, the cleaning slide includes an ultrasonic cleaning device, a suction device, and a rinsing device and the movement of the cleaning slide includes a forward movement and a return movement, upon the forward movement, the ultrasonic cleaning device and the suction device following the ultrasonic cleaning device are activated and the rinsing device following the two is deactivated, and upon the return movement, the rinsing device and the suction device following the rinsing device are activated and the ultrasonic cleaning device following the two is deactivated.

Advantageous Embodiments and Effects of the Invention

The respective method of the invention advantageously provides a way of preventing cleaning liquid and contaminants from entering the interior of print heads or into the ink supply system thereof.

Since the invention involves aspirating the cleaning liquid emitted by the ultrasonic cleaning device, it effectively prevents the cleaning liquid and potential contaminants it contains from entering the nozzle openings of the print heads and from reaching the ink supply system and spreading therein. Thus the aspiration is preferably done immediately after the ultrasonic cleaning operation, i.e. at a very short distance in terms of space and thus likewise in terms of time. The spatial distance (between the adjacent walls of the ultrasonic cleaning device and the suction device or between the respective centers of the two devices) preferably ranges between a few millimeters and a few centimeters and is preferably less than 5 cm or less than 3 cm or less than 1 cm. The same applies for the interaction between the suction device and the rinsing device, if provided, and the distances between them.

The "assembly of inkjet print heads" may be referred to as a so-called "print bar." A print bar preferably extends in a lateral direction across the entire printable width of the printing substrate. In multicolor printing, multiple print bars succeeding one another in the direction of transport of the printing substrate may be provided. The print bars including the print heads are preferably stationary in a lateral direction in an inkjet printing machine. The relative movement for the cleaning operation is preferably created by laterally moving the cleaning slide.

Advantageous and thus preferred further developments of the invention will become apparent from the dependent claims as well as from the description and drawings.

Further Developments of the Invention:

The following paragraphs describe preferred further developments of the invention (in short: further developments).

A further development may be that the activated ultrasonic cleaning device emits the cleaning liquid, in particular in an upward direction.

A further development may be that the emission of the cleaning liquid occurs from a chamber that is open towards the inkjet print heads.

A further development may be that the emission of the cleaning liquid from the chamber occurs in the form of a surge bath.

A further development may be that the emission in the form of a surge bath occurs as an overflow over a wall of the chamber that is leading on the forward movement and over a further wall of the chamber that is trailing on the forward movement. An overflow over side walls may likewise be envisaged.

A further development may be that cleaning liquid that overflows in the surge bath is collected and either removed/discharged or fed back into the chamber. For the purpose of feeding it back, a pump may be provided.

A further development may be that the collection is done in a collection channel extending adjacent to the wall and to the further wall and preferably open in an upward direction.

A further development may be that an activatable and deactivatable ultrasound source is disposed on or in the chamber to cause the cleaning liquid to vibrate in ultrasonic vibration. The ultrasound source is preferably provided on a bottom of the chamber.

A further development may be that the activated rinsing device emits a rinsing liquid, preferably in an upward direction.

A further development may be that the emission of the rinsing liquid occurs from a further chamber—different from the chamber—that is open towards the print heads. The further chamber may be provided as an open channel. The further chamber is preferably smaller than the chamber (in terms of the volume of liquid contained therein). The chamber and the further chamber preferably extend in a transverse/lateral direction across the assembly of print heads or at least in a transverse direction across the nozzle surfaces section that needs to be cleaned.

A further development may be that the cleaning liquid and the rinsing liquid are identical. They may preferably both be supplied from a common reservoir, i.e. only one liquid may be used. For this purpose, one pump or two pumps may be provided.

A further development may be that on the forward movement, the suction device aspirates air, thus also aspirating cleaning liquid and contaminants from the nozzle surfaces.

A further development may be that on the return movement, the suction device aspirates air and/or the rinsing liquid of the rinsing device, thus also aspirating cleaning liquid and contaminants from the nozzle surfaces.

A further development may be that the aspiration occurs through an aspiration channel of the suction device, the aspiration channel formed in the cleaning slide and having a suction opening open towards the inkjet print heads. In a direction transverse to the print head assembly, this channel is preferably at least as long as the chamber and the further chamber.

A further development may be that the aspirated cleaning liquid and/or rinsing liquid is fed to a liquid separator.

A further development may be that the aspirated cleaning liquid and/or rinsing liquid is fed back to the ultrasonic cleaning device or rinsing device through a feedback channel.

A further development may be that the aspirated cleaning liquid and/or rinsing liquid is fed to a waste container.

A further development may be that an adapter for the ultrasonic cleaning device is provided before the first inkjet print head of the assembly and the ultrasonic cleaning device is moved to the adapter to be filled with cleaning liquid, preferably filled completely.

A further development may be that a further adapter is provided after the last inkjet print head of the assembly and the ultrasonic cleaning device is moved to the further adapter to be emptied of cleaning liquid, preferably emptied completely.

The adapters may preferably be provided as fitting covers for the ultrasonic cleaning device or the chamber thereof.

A further development may be that the cleaning slide is provided on a cleaning drawer movable in a horizontal direction.

A further development may be that the cleaning slide is moved with the cleaning drawer, preferably out of a park position of the drawer.

A further development may be that the cleaning drawer is moved under the assembly of inkjet print heads in a horizontal direction.

A further development may be that a roll table provided for transporting the printing substrate is lowered.

A further development may be that the cleaning drawer is moved into the room created by the lowering.

A further development may be that the cleaning slide is provided as a part of a cleaning box including a trough, the cleaning box provided on the cleaning drawer.

A further development may be that upon a stop between forward and return movements of the cleaning slide, the inkjet print heads emit ink into a trough of the cleaning box (known as "purging").

A further development may be that multiple cleaning boxes are provided, each having a trough and a cleaning slide movable in a longitudinal direction relative to the box. In this case, preferably all cleaning slides are moved together.

A further development may be that for a simultaneous cleaning of multiple assemblies of inkjet print heads, a corresponding number of cleaning boxes is provided. For instance, four (for CMYK), seven (for CMYK+OGV) or eight (for CMYK+OGV+white) cleaning boxes may be provided for a corresponding number of inks in multicolor printing.

A further development may be that the cleaning slide is spring-mounted against the cleaning box. Thus, the cleaning slide may spring-loaded against the print heads and may slide along the print heads (yet without contacting the nozzle surfaces). In this process, a precise tolerance of +/−0.02 mm may be maintained. In cleaning and rinsing operations, the slide preferably moves at a speed of between 20 and 80 mm/sec on the forward and return movements.

A further development may be that a defined distance is maintained between the ultrasonic cleaning device, the suction device, and the rinsing device on the one hand and the nozzle surfaces on the other hand. This avoids damage to the sensitive nozzle surfaces.

A further development may be that the cleaning drawer is motor-driven. A further development may be that a motor is provided for this purpose.

A further development may be that the cleaning method is implemented in an inkjet printing machine.

A further development may be that in the process, an assembly of inkjet print heads is cleaned by using the one cleaning box.

A further development may be that in the process, multiple parallel assemblies of inkjet print heads may be cleaned by using multiple cleaning slides that are movable in parallel.

A further development may be that the multiple cleaning slides are moved together.

A further development may be that a cleaning drawer with multiple cleaning boxes is moved by a motor in a horizontal direction from a park position that is lateral relative to a direction of transport of a printing substrate and into a cleaning position, in the cleaning position, multiple cleaning slides are jointly moved along a corresponding number of print bars for cleaning purposes in a horizontal forward movement and for rinsing purposes in a horizontal return movement, while an ultrasound source is activated during cleaning, and the cleaning drawer is subsequently returned to the park position.

Any desired combination of the features and combinations of features disclosed in the above sections regarding the technical field, invention, and further developments as well as in the section below regarding exemplary embodiments likewise represents advantageous further developments of the invention.

Other features which are considered as characteristic for the invention are set forth in the appended claims.

Although the invention is illustrated and described herein as embodied in a method of cleaning nozzle surfaces of an inkjet print head assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
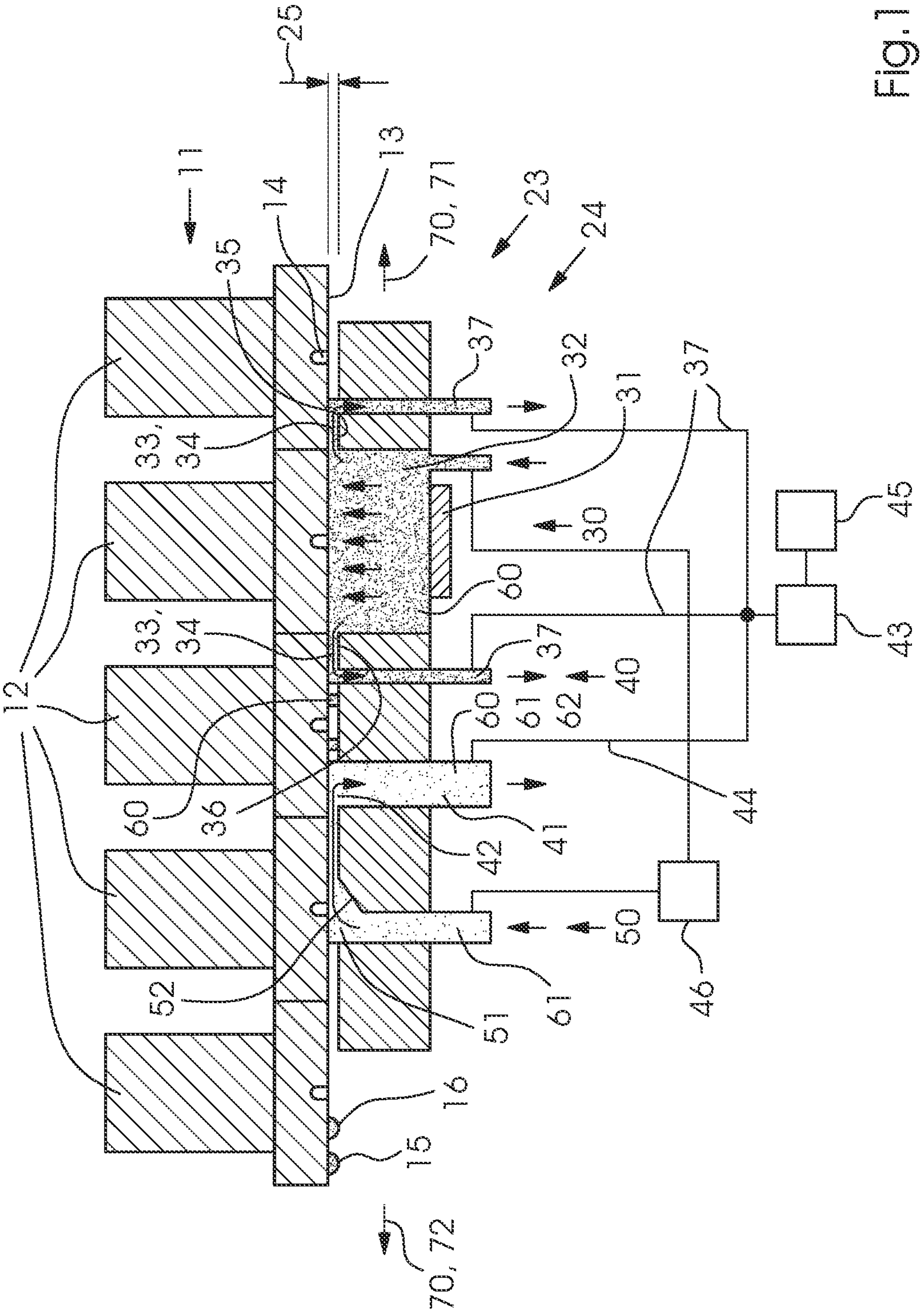
FIG. 1 is a diagrammatic, longitudinal-sectional view of a preferred exemplary embodiment of a device for implementing a preferred exemplary embodiment of a cleaning method of the invention.

Referring now in detail to the figures of the drawings, in which corresponding features have the same reference symbols, there is seen an inkjet printing machine 10 for industrial high-quality and high-performance inkjet printing, preferably to print on web-shaped printing substrates such as paper or label material, including at least one assembly 11 (i.e. as a so-called print bar) of multiple inkjet print heads 12 preferably disposed in a row and directed downward and stationary during printing, the assembly 11 being oriented in a transverse direction relative to the printing substrate or rather to the direction of transport thereof). Every print head 12 has a nozzle surface 13 with a plurality of nozzles 14 for emitting ink 15 in the form of tiny individual droplets in a controlled way and in accordance with the information of the image to be printed. These nozzle surfaces are very sensitive and therefore need to be carefully cleaned to remove potential contaminants 16 such as solidified ink 15 and/or dust (e.g. paper dust).

Figure 2:
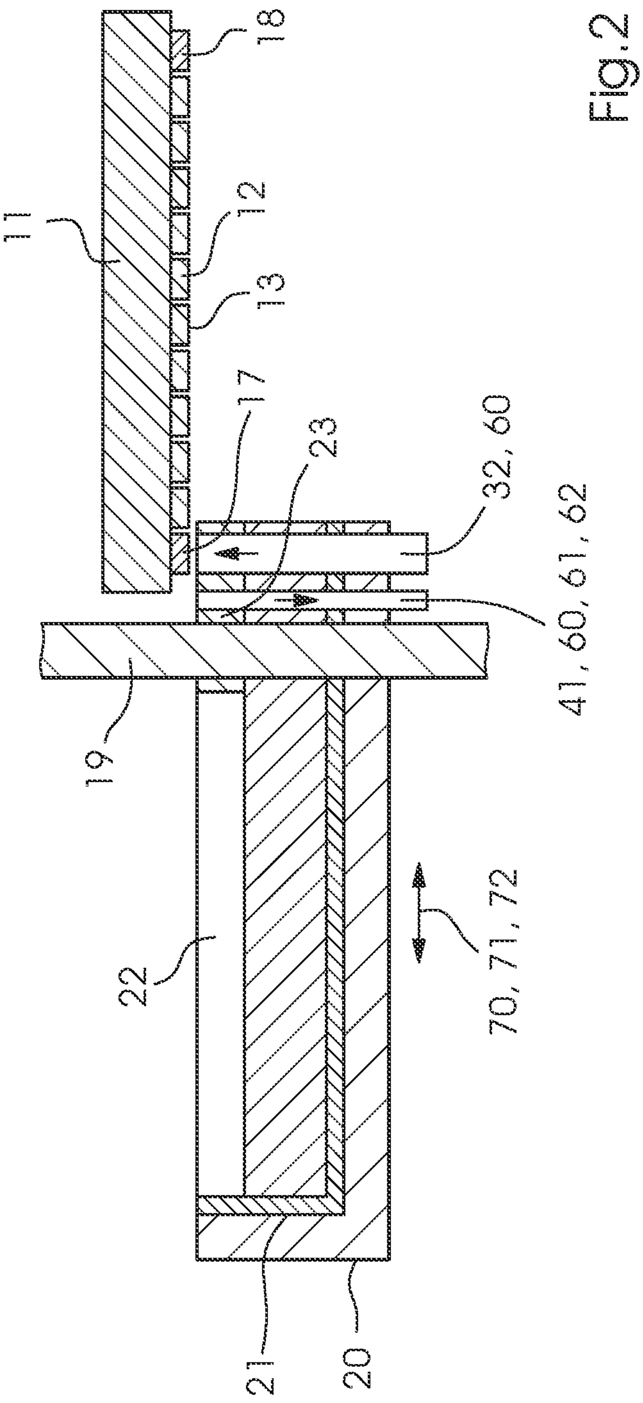
FIG. 2 is a cross-sectional view of the device.
Figure 3:
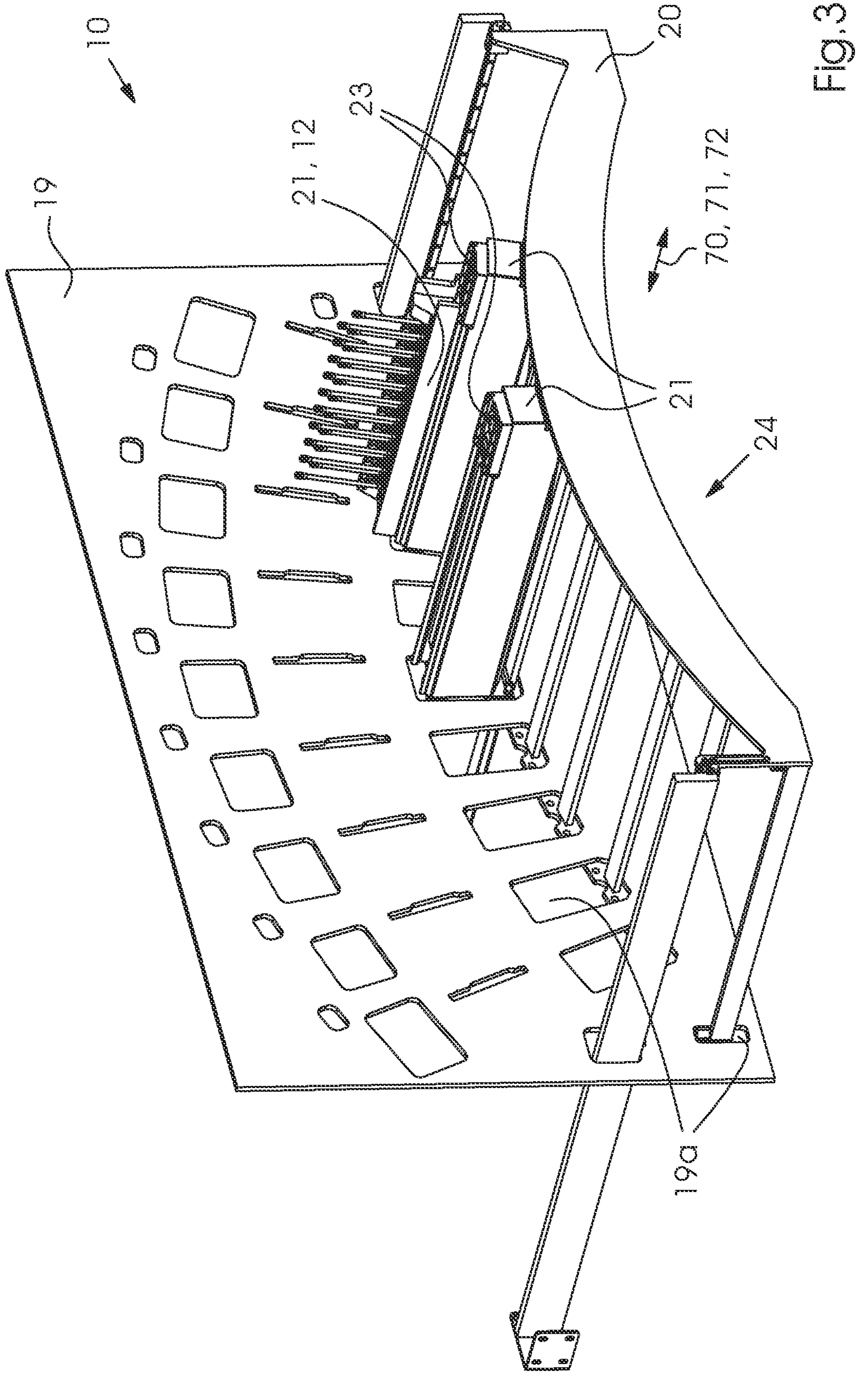
FIG. 3 is a perspective view of a printing machine.

The device preferably includes multiple elongated cleaning boxes 21 disposed to be parallel to one another and preferably to be jointly movable in a horizontal direction parallel to the print bars (i.e. the direction of the longitudinal extension thereof). All boxes 21 may preferably be disposed on a cleaning drawer 20 movable in a horizontal direction and may be moved together with the drawer 20 in a forward direction 71 and a return direction 72. FIGS. 1 and 2 are sectional views from the side, each figure illustrating an example of a single such box 21; FIG. 3 illustrates two.

In the aforementioned transverse direction, the drawer 20 is preferably motor-driven to move back and forth between a cleaning position and a park position. During printing, the drawer is retracted and in the park position and the nozzle surfaces are exposed above the printing substrate transported beneath them. Each one of the cleaning boxes 21 includes a trough 22 that is open towards the top to implement a process known as purging the print heads 12, and a cleaning slide 23 movable back and forth in a direction 70 to clean and rinse the nozzle surfaces 13 and/or the nozzles 14 in an upward direction. FIG. 1 illustrates the slide 23 in a cleaning position 24, i.e. it is at a short distance below the nozzle surfaces 13. (When the drawer 20 is in its cleaning position), the cleaning slide is movable back and forth along the nozzle surfaces. This movement may be motor-driven, for instance by a non-illustrated motor with a belt drive. The forward movement (preferably in the direction of the operating side OS of the machine) is for cleaning purposes, whereas the return (or backward) movement (preferably in the direction of the drive side DS of the machine) is for rinsing purposes after the cleaning. The cleaning slide is preferably positioned and movable at a short distance 25 from the nozzle surface. The gap formed by the distance between the slide and the nozzle surfaces prevents direct contact between them, thus avoiding damage to the nozzle surfaces. In addition, the gap is used to receive liquids for cleaning and/or rinsing.

The cleaning slide 23 includes three devices: an ultrasonic cleaning device 30, a suction device 40, and a rinsing device 50. These devices may be provided in a common block of the slide. The device 30 uses a cleaning liquid 60; the device 50 uses a rinsing liquid 61.

FIG. 2 illustrates the same device as in FIG. 1 but with less detail. However, it can be seen that the illustrated print bar 11 has an adapter 17 and a further adapter 18 at the start and at the end of the row of print heads 12. Each one of the two adapters has adapter surfaces disposed in the same plane as the nozzle surfaces 13. The adapters may be constructed as aluminum blocks. In this way, the adapters may be used for operations which might put stress on the print heads or contaminate or damage them. The adapters 17, namely the adapter surface thereof, are used, for instance, to close the device 30 when it is being filled with the cleaning liquid, although a gap between the adapter 17 and the device 30 remains (in a way similar to the gap between print heads 12 and device 30), whereas the further adapter 18, namely the adapter surface thereof, is used to control the device 40 or rather the vacuum required in the device 40 for suction purposes. Thus filling and emptying operations are preferably not done near the print head 12 but at the adapters. Once the filling has been completed, an ultrasound source and the suction action are activated (see below) and the cleaning slide 23 passes (preferably once) underneath the nozzle surfaces (cleaning motion; forward movement). Then, an optional purging operation may take place, i.e. the print heads eject ink into the trough 22 to push out cleaning liquid residue that may have entered the print heads. In order to remove ink residue from the print heads, i.e. from the nozzle surfaces thereof, a rinsing movement (return movement) including the introduction of rinsing liquid is carried out (see also below). It is clearly likewise possible to carry out the cleaning movement and the rinsing movement in the respective opposite direction as long as the cleaning operation is done first and the rinsing operation afterwards.

FIGS. 2 and 3, also illustrate a side wall 19 of the printing machine 10 (on the drive side DS of the machine); the drawer 20 is preferably moved back and forth through an opening 19*a* in the side wall (or parts, e.g. drawer carriers extending in a lateral direction are moved through corresponding openings 19*a*). The park position is preferably behind the side wall (with the print heads and the transport path for the printing substrate in front of the side wall). The movement is preferably motor-driven by a motor 26 which drives the drawer.

FIG. 1 illustrates an activatable ultrasound source 31 disposed on the bottom of a chamber 32 for cleaning liquid 60 to be discharged. The device 30 forms a surge bath 33 with a respective overflow 34 over a leading wall 35 (on the forward movement) and a trailing further wall 36 (on the forward movement). In the cleaning operation, i.e. on the forward movement, the cleaning liquid is caused to vibrate in ultrasonic vibration and contacts the nozzle surfaces 13, causing them to be cleaned. Excess liquid 60 is fed back to a liquid separator 43 through one or more collection channels 37 and subsequently disposed of in a waste container 45. This may be achieved solely through gravity of the ink without any pump. The cleaning liquid may be supplied from a reservoir 46 through a supply line. A pump may be used for this purpose.

On the forward movement of the cleaning movement (to the right-hand side in the example of FIG. 1), it is not only the device 30 for cleaning that is activated but also the trailing device 40 for suction. The device 40 includes a suction channel 41 with a suction opening 42 open towards the top towards the nozzle surfaces 13. Liquid 60 that was emitted by the device 30 but is not fed back through the collection channels 37, for instance because it adheres to the nozzle surface, is aspirated, preferably together with air 62, by the device 40. Such aspirated liquid is fed back to the liquid separator 43 through a feedback channel 44 and/or a feedback line 44 and then to the waste container 45 to be disposed of.

The device shown in FIG. 1 further includes the rinsing device 50, which is activated on the backward movement of the cleaning movement (to the left-hand side in the illustrated example of FIG. 1) together with the trailing suction device 40. The device 50 emits a rinsing liquid 61 coming from a further chamber 51, preferably equipped with a rinsing slant 52 in the direction of the suction device 40. The rinsing liquid 61 is aspirated, preferably together with air 62, by the aspiration device 40. In this process, the aspirated liquid 61, which contains contaminants, is fed to the liquid separator 43 through the feedback channel 44 to be fed to the waste container 45 and disposed of. The rinsing liquid may be supplied from the reservoir 46 through a supply line. A pump may be used for this purpose. Rinsing liquid and cleaning liquid may preferably be the same liquid. As an alternative to the illustrated embodiment of the rinsing device 50, which includes the further chamber 51 with the rinsing slant 52, the rinsing device may include a device for spraying on rinsing liquid 61, for instance a spray bar with spray nozzles.

FIG. 3 is a perspective view of a printing machine 10. Machine parts that are not relevant in the context of the invention have been left out for reasons of visibility. The figure shows the side wall 19 with multiple openings 19*a*, the cleaning drawer 20 in the cleaning position 24, two examples of cleaning boxes 21, each including a cleaning slide 23, and an example of a print bar 11 with print heads 12.

The following is a summary list of reference numerals and the corresponding structure used in the above description of the invention.

LIST OF REFERENCE SYMBOLS

10 inkjet printing machine
11 assembly/assemblies/print bar
12 inkjet print heads
13 nozzle surfaces
14 nozzles
15 ink
16 contamination
17 adapter
18 further adapter
19 side wall
19*a* openings
20 cleaning drawer
21 cleaning box(es)
22 trough(s)
23 cleaning slide
24 cleaning position(s)
25 distance
26 motor
27 belt
30 ultrasonic cleaning device
31 ultrasound source
32 chamber for cleaning liquid to be emitted
33 surge bath
34 overflow
35 leading wall
36 trailing further wall
37 collection channel/collection line
40 suction device
41 suction channel
42 suction opening
43 liquid separator
44 feedback channel/feedback line
45 waste container
46 reservoir
50 rinsing device
51 further chamber for rinsing liquid to be emitted
52 rinsing slant
60 cleaning liquid
61 rinsing liquid
62 air
70 movement of the cleaning slide
71 forward movement
72 backward movement

The invention claimed is:

1. A method for cleaning nozzle surfaces of an inkjet print head assembly, the method comprising:
- providing a cleaning slide including an ultrasonic cleaning device, a suction device, and a rinsing device;
- using the cleaning slide to carry out a movement along the assembly and clean the nozzle surfaces with a cleaning liquid in ultrasonic vibration;
- carrying out the movement of the cleaning slide with a forward movement and a backward movement;
- during the forward movement, activating the ultrasonic cleaning device and activating the suction device following the ultrasonic cleaning device, while keeping the rinsing device deactivated following the two;
- during the backward movement, activating the rinsing device and activating the suction device following the rinsing device, while deactivating the ultrasonic cleaning device following the two;
- emitting a rinsing liquid from the activated rinsing device;
- emitting the cleaning liquid from a chamber; and
- emitting the rinsing liquid from a different further chamber being open towards inkjet print heads of the inkjet print head assembly.

2. The method according to claim 1, which further comprises emitting the cleaning liquid from the activated ultrasonic cleaning device.

3. The method according to claim 2, which further comprises emitting the cleaning liquid from a chamber being open towards inkjet print heads of the inkjet print head assembly.

4. The method according to claim 3, which further comprises emitting the cleaning liquid from the chamber as a surge bath.

5. The method according to claim 2, which further comprises during the forward movement, using the suction device to aspirate air and also aspirate the cleaning liquid and contamination off of the nozzle surfaces.

6. A method for cleaning nozzle surfaces of an inkjet print head assembly. the method comprising:
- providing a cleaning slide including an ultrasonic cleaning device, a suction device, and a rinsing device;
- using the cleaning slide to carry out a movement along the assembly and clean the nozzle surfaces with a cleaning liquid in ultrasonic vibration;
- carrying out the movement of the cleaning slide with a forward movement and a backward movement;
- during the forward movement, activating the ultrasonic cleaning device and activating the suction device following the ultrasonic cleaning device, while keeping the rinsing device deactivated following the two;
- during the backward movement, activating the rinsing device and activating the suction device following the rinsing device, while deactivating the ultrasonic cleaning device following the two;
- emitting a rinsing liquid from the activated rinsing device; and
- during the backward movement, using the suction device to aspirate the rinsing liquid of the rinsing device and also aspirate the cleaning liquid and contamination off of the nozzle surfaces.

7. A method for cleaning nozzle surfaces of an inkjet print head assembly, the method comprising:
- providing a cleaning slide including an ultrasonic cleaning device, a suction device, and a rinsing device;
- using the cleaning slide to carry out a movement along the assembly and clean the nozzle surfaces with a cleaning liquid in ultrasonic vibration;
- carrying out the movement of the cleaning slide with a forward movement and a backward movement;
- during the forward movement, activating the ultrasonic cleaning device and activating the suction device following the ultrasonic cleaning device, while keeping the rinsing device deactivated following the two;
- during the backward movement, activating the rinsing device and activating the suction device following the rinsing device, while deactivating the ultrasonic cleaning device following the two;
- emitting the cleaning liquid from the activated ultrasonic cleaning device;
- emitting a rinsing liquid from the activated rinsing device;
- during the forward movement, using the suction device to aspirate air and also aspirate the cleaning liquid and contamination off of the nozzle surfaces; and
- during the backward movement, using the suction device to aspirate the rinsing liquid of the rinsing device and also aspirate the cleaning liquid and contamination off of the nozzle surfaces.

8. The method according to claim 7, which further comprises carrying out the aspiration through a suction channel of the suction device, the suction channel being formed in the cleaning slide and having a suction opening being open towards inkjet print heads of the inkjet print head assembly.

9. A method for cleaning nozzle surfaces of an inkjet print head assembly, the method comprising:
- providing a cleaning slide including an ultrasonic cleaning device, a suction device, and a rinsing device;
- using the cleaning slide to carry out a movement along the assembly and clean the nozzle surfaces with a cleaning liquid in ultrasonic vibration;
- carrying out the movement of the cleaning slide with a forward movement and a backward movement;
- during the forward movement, activating the ultrasonic cleaning device and activating the suction device following the ultrasonic cleaning device, while keeping the rinsing device deactivated following the two;
- during the backward movement, activating the rinsing device and activating the suction device following the rinsing device, while deactivating the ultrasonic cleaning device following the two; and
- providing an adapter for the ultrasonic cleaning device in front of a first inkjet print head of the inkjet print head assembly, and moving the ultrasonic cleaning device towards the adapter to be filled with the cleaning liquid.

10. The method according to claim 9, which further comprises providing a further adapter for the ultrasonic cleaning device after a last inkjet print head of the inkjet print head assembly, and moving the ultrasonic cleaning device towards the further adapter to be emptied of the cleaning liquid.

11. A method for cleaning nozzle surfaces of an inkjet print head assembly, the method comprising:
- providing a cleaning slide including an ultrasonic cleaning device, a suction device, and a rinsing device;
- using the cleaning slide to carry out a movement along the assembly and clean the nozzle surfaces with a cleaning liquid in ultrasonic vibration;
- carrying out the movement of the cleaning slide with a forward movement and a backward movement;
- during the forward movement, activating the ultrasonic cleaning device and activating the suction device following the ultrasonic cleaning device, while keeping the rinsing device deactivated following the two;
- during the backward movement, activating the rinsing device and activating the suction device following the rinsing device, while deactivating the ultrasonic cleaning device following the two; and
- placing the cleaning slide on a cleaning drawer being movable in a horizontal direction.

12. The method according to claim 11, which further comprises providing the cleaning slide as a part of a cleaning box, and placing the cleaning box on the cleaning drawer.

* * * * *